United States Patent
Barone et al.

(10) Patent No.: US 11,919,096 B2
(45) Date of Patent: Mar. 5, 2024

(54) METHOD FOR MACHINING THIN PLATES AND ELASTIC JOINTS PARTICULARLY FOR MONOLITHIC MECHANICAL OSCILLATORS

(71) Applicant: UNIVERSITÀ DEGLI STUDI DI SALERNO, Fisciano (IT)

(72) Inventors: Fabrizio Barone, Fisciano (IT); Gerardo Giordano, Fisciano (IT)

(73) Assignee: UNIVERSITÀ DEGLI STUDI DI SALERNO, Fisciano (IT)

( * ) Notice: Subject to any disclaimer, the term of this patent is extended or adjusted under 35 U.S.C. 154(b) by 439 days.

(21) Appl. No.: 17/266,220

(22) PCT Filed: Jul. 24, 2019

(86) PCT No.: PCT/IB2019/056319
§ 371 (c)(1),
(2) Date: Feb. 5, 2021

(87) PCT Pub. No.: WO2020/031008
PCT Pub. Date: Feb. 13, 2020

(65) Prior Publication Data
US 2021/0299765 A1    Sep. 30, 2021

(30) Foreign Application Priority Data
Aug. 6, 2018    (IT) ......................... 102018000007873

(51) Int. Cl.
*B23C 3/00*    (2006.01)
*B23B 1/00*    (2006.01)
(Continued)

(52) U.S. Cl.
CPC ................. *B23C 3/00* (2013.01); *B23B 1/00* (2013.01); *B23P 13/02* (2013.01);
(Continued)

(58) Field of Classification Search
CPC ... B23C 3/00; B23C 2220/48; B23C 2215/64; B23P 13/02
See application file for complete search history.

(56) References Cited

U.S. PATENT DOCUMENTS 8,950,263 B2    2/2015   Giordano et al.
9,256,000 B2    2/2016   Barone et al.
(Continued)

FOREIGN PATENT DOCUMENTS

JP    H09131610 A    5/1997

OTHER PUBLICATIONS

International Search Report and Written Opinion for corresponding PCT/IB2019/056319 dated Oct. 9, 2019, 9 pages.

*Primary Examiner* — Christopher J Besler
(74) *Attorney, Agent, or Firm* — Armstrong Teasdale LLP

(57) ABSTRACT

Described herein is a method for manufacturing thin metal sheets and joints by removing material from a single block of material, i.e. for obtaining items including one or more thin sheets and/or thin elastic joints seamlessly connected to one another by means such as milling. The method can be employed in the manufacturing of a high-sensitivity, low-frequency, broadband monolithic mechanical sensor for measuring linear and angular displacements of based on a folded pendulum configuration for monitoring and control applications.

6 Claims, 9 Drawing Sheets

(51) Int. Cl.
*B23P 13/02* (2006.01)
*G01P 15/08* (2006.01)

(52) U.S. Cl.
CPC ...... *G01P 15/0802* (2013.01); *B23B 2215/64* (2013.01); *B23C 2215/00* (2013.01); *B23C 2220/48* (2013.01)

(56) References Cited

U.S. PATENT DOCUMENTS

| | | |
|---|---|---|
| 10,345,104 B2 | 7/2019 | Barone et al. |
| 2011/0016712 A1 | 1/2011 | Berlanger et al. |
| 2011/0041334 A1* | 2/2011 | Berlanger ............ B23P 15/006 |
| | | 451/36 |
| 2011/0120278 A1 | 5/2011 | Ochiai et al. |
| 2014/0000079 A1 | 1/2014 | Smith et al. |
| 2016/0318151 A1 | 11/2016 | Kitahata et al. |

* cited by examiner

METHOD FOR MACHINING THIN PLATES AND ELASTIC JOINTS PARTICULARLY FOR MONOLITHIC MECHANICAL OSCILLATORS

CROSS-REFERENCE TO RELATED APPLICATIONS

This application is the U.S. National Stage Entry of International Patent Application No. PCT/IB2019/056319, filed Jul. 24, 2019, which claims the benefit of priority to Italian Patent Application No. 102018000007873, filed on Aug. 6, 2018, each of which is hereby incorporated by reference herein in its entirety.

The present invention relates to a method for manufacturing thin metal sheets and joints by removing material from a single block of material, i.e. for manufacturing obtained items consisting of one or more thin sheets and/or thin elastic joints seamlessly connected to one another by removing material by means of processes based on milling [1].

An example of possible application of such a method to complex obtained items is the manufacturing of a high-sensitivity, low-frequency, broadband monolithic mechanical sensor for measuring linear and angular displacements of based on a folded pendulum configuration for monitoring and control applications [2] [3] [4] [5] [6].

BACKGROUND ART

At present, there is no procedure which allows the manufacturing of thin metal sheets and joints by removing material, i.e. which allows these components to be obtained by processes based on milling alone.

For example, the procedure for manufacturing a thin joint (of the order of 100 microns or less in thickness) by means of milling implies the removal of the material firstly on one side and then on the other side. The material for the manufacturing of the first face can be removed by means of standard milling procedures because the joint has not yet been formed, the cutter thus acting on a solid structure which is resistant to the pressure of the cutter itself. The removal of the material for the second face is, on the other hand, a particularly delicate process, because during the milling operation the tool applies pressure on a thin joint being formed, which becomes increasingly structurally weaker as the process proceeds, thus being deformed at best in elastic manner and in any case in an uncontrollable manner. Indeed, the joint is subjected to significant mechanical stress, which may reach the plastic deformation and/or breakage zone already for thicknesses of the order of hundreds of microns, with uncontrolled modification of the mechanical properties of the material itself. Not less important is the consideration that a deformation, albeit elastic, of the joint during the step of manufacturing is unlikely to achieve the design specifications with the usual mechanical processing procedures by means of milling. Indeed, becoming thinner during milling, the joint deforms under the pressure of the cutter itself, which, being numerically controlled on the basis of pre-settings, removes the material in uncontrolled manner, with an end result which does not generally comply with that of design, even when there is no breakage or permanent deformation of the joint itself.

For these reasons, thin metal sheets and joints are processed today utilizing the WEDM technique [7], which allows the removal of material without mechanical stress for the worked piece, thus allowing the manufacturing of thin metal sheets and elastic joints up to 50 microns, but which does not ensure the original mechanical properties of the material because the process implies the passage of an electrical discharge through the material being worked.

The same applies to thin metal sheets, where the term "thin metal sheet" means, in the present description, an oblong element which has a first end connected to a body and a free end, e.g. opposite to said first end.

More in detail, WEDM uses a wire made of conductive material as a tool, which is stretched through a hole into the material, which must necessarily be a good conductor, and moved until coming into contact with the material itself in order to obtain the cut.

The process is based on the thermo-mechanical property of electrical discharges to erode materials and consists in approaching the cutting tool (electrode) closer to the material to be worked, immersing material and electrode in a liquid dielectric, which also has the function of cooling the material during the process. A negative electrical potential is thus applied to the tool in relation to the worked material. When the distance between the tool and the material is sufficiently small to generate a discharge through the dielectric, a plasma channel (arc) is generated, which melts the surface of the material and removes it at the points in which the cut is intended.

During cutting, the tool is advanced as the erosion proceeds so as to maintain a predefined distance from the material being worked. The process generates waste, which appears as dust and is dispersed in the dielectric, not chips.

This technique has three important advantages:
  a. possibility of working very hard metals (special steels, high-speed steels, hard metals, etc.), or metals hardened with heat or chemical treatments (tempered, carburized, etc.), it not being necessary for the tool (wire) to have a hardness or a mechanical strength greater than that of the worked material;
  b. possibility of making cuts and holes which are impossible with other conventional techniques (sharp edges, ribs and cavities with complex shapes or profiles);
  c. possibility of working very thin metal sheet surfaces, because the passage of the wire does not apply pressure onto the surface to be worked, thus not subjecting the material to stress the process.

A disadvantage of electrical discharge machining, on the other hand, is that it is only possible to perform axial processes because the presence of the conductor wire is always necessary. This type of processing weakens the workpiece, in many cases, because some parts along the erosion axis could be advantageously maintained in order to provide greater general and/or local structural rigidity. Additionally, in the case of creations providing joints positioned on opposite faces of a piece, the processing type makes it very difficult to create joints which are not positioned symmetrically on the faces themselves.

Processing by means of mechanical milling, on the other hand, is completely different, because it works by mechanically removing material by means of the action of cutting tools having defined geometry, called cutters, mounted on machine tools (milling machines). The milling action provides the rotation of the tool and the relative movement between it and the material to be worked: during the rotation, the cutting edges of the cutter remove material from the piece when it comes into contact with the cutter as a result of a translation between the piece to be worked and the cutter itself. Mechanical milling allows the production of parts with tolerances of less than one micron with surface finish even in mirror (up to 100 nanometers).

An important element, however, and limit of the milling action, is that the cutter must necessarily apply pressure on the surface on which it acts to remove the material.

In general, the milling process provides a roughing step and a finishing step. Roughing removes material from the piece being worked more rapidly, and thus more economically, leaving a sufficient layer of metal to be removed in the next finishing step. In this second step, the excess parts are removed to reach the expected dimensions, so as to respect design dimensions and tolerances, including those relating to the degree of roughness of the surfaces.

The milling processes are currently performed with CNC (Computer Numerical Control) machines, provided with adjustable heads (cutters) with tilting axes able to rotate gyroscopically along two axes, which allow the orientation of the cutters with respect to all the work planes, this property being relevant for manufacturing objects with even very complex shapes. Milling with CNC technology allows the creation of very smooth surfaces with very high precision (in the order of 100 nanometers), rapidly, automatically and at a very low cost, but does not allow the production of thin metal sheets and joints (in the order of 100 microns) by direct application.

The following table summarizes the main differences between the two techniques.

|  | Technique | |
| --- | --- | --- |
|  | WEDM | Milling |
| Thin metal sheets and joints | Possibility of manufacturing thin metal sheets and joints up to 50 microns thick, without introducing deformations and mechanical stress during the step of working. | Impossibility of manufacturing thin metal sheets and joints, due to the introduction of deformations and mechanical stress during the step of working, which can lead to breakage. |
| Materials | Only conductive materials (steel, aluminum, etc.) can be worked. | All materials can be worked. |
| Processing | Possibility of manufacturing even small holes and through edges in the material (radius of curvature 125 microns). Impossibility of manufacturing threads. | Possibility of manufacturing holes (even not through holes) in the material. Possibility of creating internal edges. Possibility of manufacturing threads |
| Cost | High process costs. | Low process costs. |

In brief, at present, thin metal sheets and joints are necessarily made using the WEDM technique using only conductive materials because working thin metal sheets and joints with a thickness of less than a few hundred microns by means of milling is not possible.

A clear demonstration of this is that monolithic sensors based on folded pendulum architecture, which is the international state of the art of mechanical sensors, are all made with a mixed technique: milling for manufacturing the monolithic body and the main components, wired electrical discharge machining for manufacturing the mechanical joints only, generally of a thickness of the order of 100 microns [1] [2].

The need is therefore felt to have a method that allows:
a. the manufacturing of thin metal sheets and joints with a thickness of even less than 100 microns, but of superior quality in terms of surface finish compared to WEDM;
b. the manufacturing of thin metal sheets and joints of non-conductive materials, overcoming one of the most important limitations displayed by the WEDM technique.

The need is also felt to develop fully automatic processing procedures, with increase of processing speed and reduction of production costs, complete automation, as well as further processing possibilities, such as the creation of through holes, threads, thin sheets (<100 μm) without structural deformations or modifications (e.g. due to the passage of electricity in electrical discharge machining), working on non-conductive materials.

Furthermore, the need is felt to manufacture each mechanical component by processing using a single method for both more resistant components and for the more delicate components (such as thin joints).

OBJECT AND SUBJECT-MATTER OF THE INVENTION

It is the purpose of the present invention to provide a mechanical processing method by removing material from a blank by means of processes based on milling, e.g. for manufacturing thin metal sheets and joints.

It is a further purpose of the present invention to provide a method which allows the manufacturing of obtained items from a single block of material constituted by one or more elastic joints seamlessly connected to one another by removing material with processes based on milling alone.

Finally, it is another specific purpose of the present invention to provide a method for manufacturing a Watt's linkage based monolithic sensor, also in folded pendulum configuration, by means of milling, at low-cost, to be used as a mechanical oscillator for manufacturing seismometers, velocimeters, accelerometers and tiltmeters to be used for monitoring and control.

It is a further specific purpose of the present invention a removable immobilization element which allows the process according to the method of the invention. This element helps the process in the method and provides safety means for transporting the folded pendulum.

It is a subject-matter of the present invention a method for manufacturing thin metal sheets or joints according to the appended claims.

It is a further specific subject-matter of the present invention a method for manufacturing a folded monolithic pendulum according to the appended claims.

It is a further specific subject-matter of the present invention a removable immobilization element to be used in the method of the invention, according to the appended claims.

The invention will now be described by way of non-limiting example, with particular reference to the figures of the accompanying drawings, in which.

Figure 15:
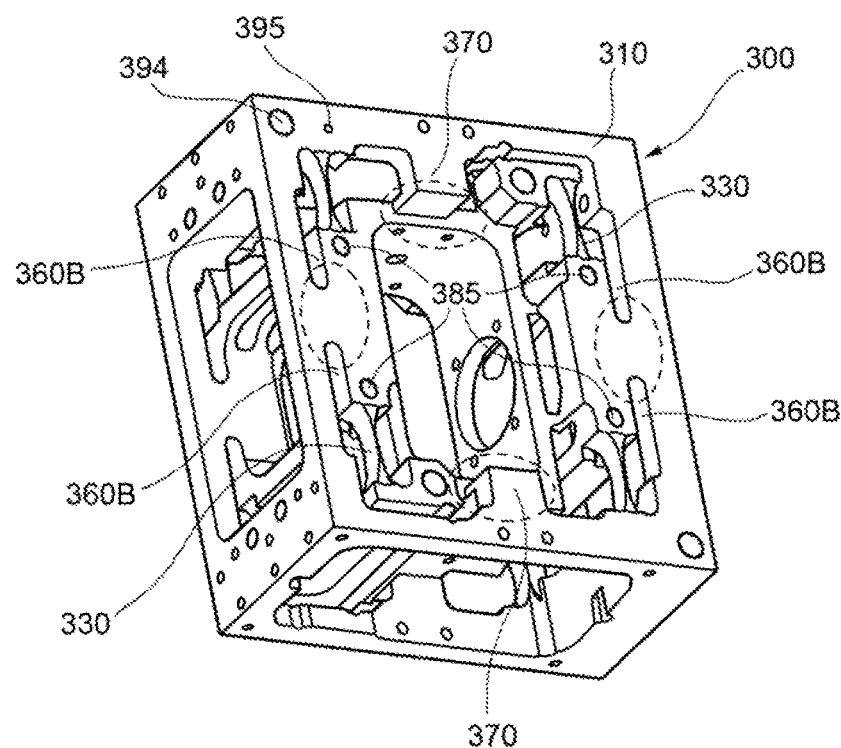

FIG. 15 shows the result of a machining operation for removing material not adjacent to the joints, preparatory to the final milling operation for eliminating the parts which keep the movable parts of the folded pendulum (central mass, arms) locked with respect to the structure (frame). The figure also shows the presence of holes and threads in the piece which are functional to the application of readout systems, fixing systems, etc., necessary for the operation of the folded pendulum, but not related to the described novel working method by means of milling. The dashed ellipses show the parts which keep the movable parts of the folded pendulum locked to the fixed structure (the rear face is identical, having been worked with the same procedure).

Figure 16:
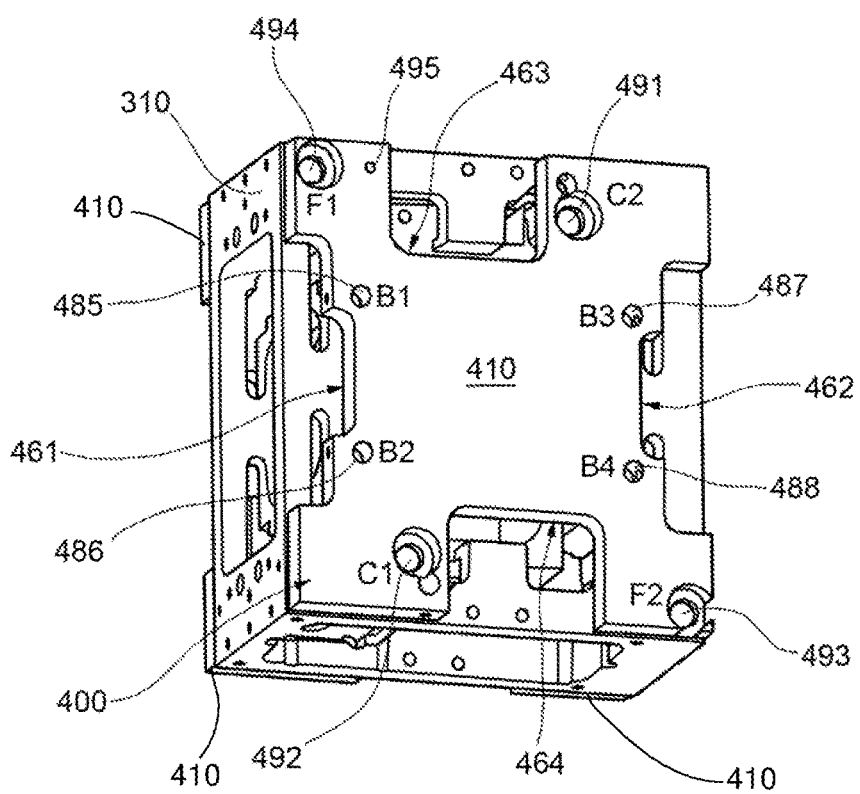

FIG. 16 shows the bracketing (or "removable immobilization") system according to the present description: the figure shows the holes for locking the two pendulum arms, the holes for locking the central mass and the holes for fixing to the fixed structure.

Figure 17:
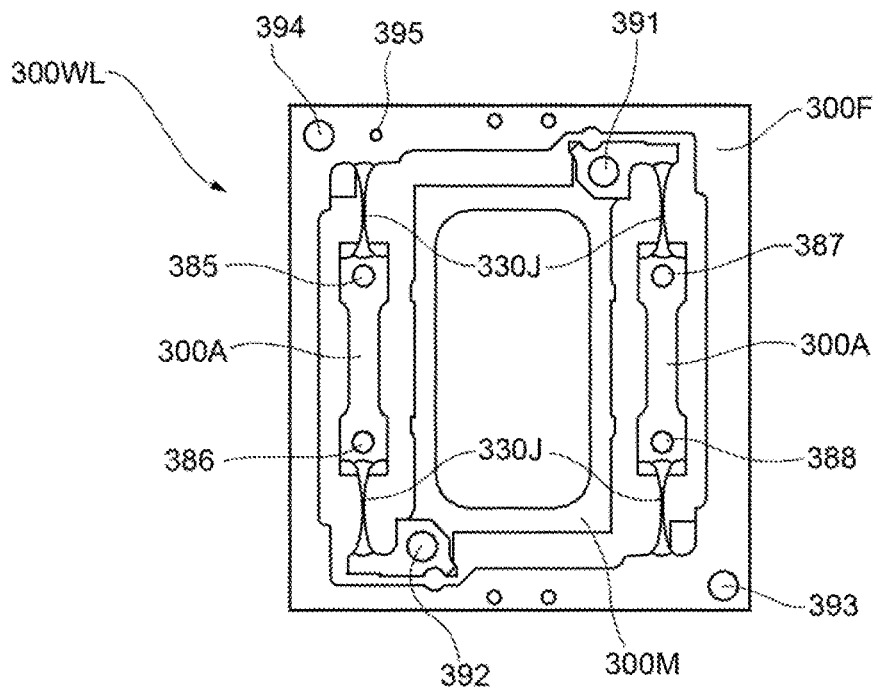

FIG. 17 shows the front view of the folded pendulum made means of milling alone according to the present description.

Figure 18:
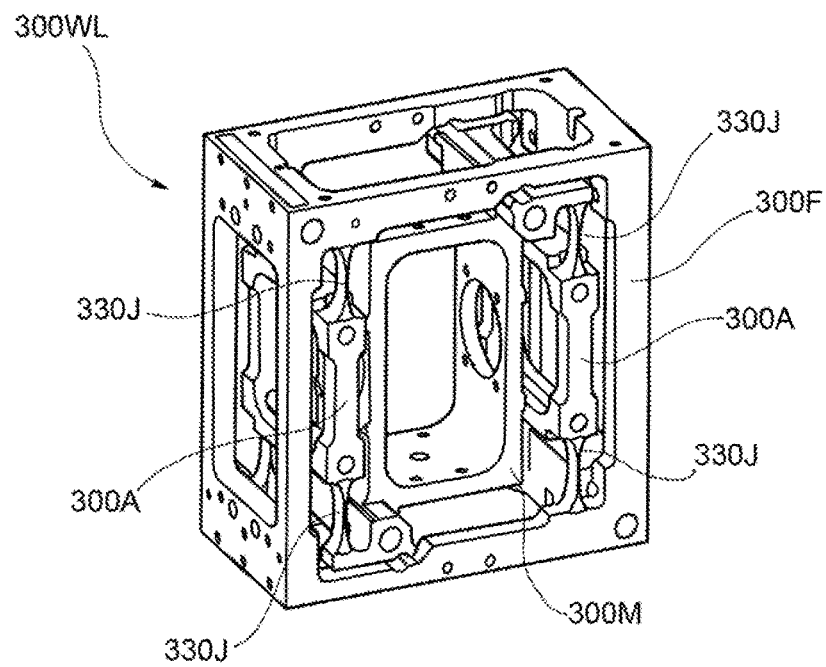

FIG. 18 shows the perspective view of the folded pendulum made means of milling alone according to the present description.

PRINCIPLE OF OPERATION OF THE INVENTION

The present description introduces a mechanical processing method of the materials aimed at manufacturing thin metal sheets and joints (even with a thickness of less than 100 microns), which, as shown above, may be achieved in the prior art only using conductive materials (substantially metals) by means of WEDM (Wired Electrical Discharge Machining) techniques [7] only in particular conditions and with various limitations.

The processing method described herein allows the manufacturing, from a single block of material, of thin metal sheets and joints (for example, but not exclusively, elastic) as well as complex obtained items, consisting of one or more thin metal sheets and/or thin elastic joints seamlessly connected to one another, using only the milling technique, also overcoming the material conductivity limitations imposed by WEDM.

The processing method of thin metal sheets and joints by means of milling illustrated in the present description is independent from the type of design in which such thin metal sheets and joints are used. For example, it is independent from the design of Watt's linkage based monolithic sensors. However, it assumes a particular embodiment for such monolithic sensors, in particular Watt's linkage based, also in folded pendulum configuration, to be used as mechanical oscillators for manufacturing seismometers, velocimeters, accelerometers and tiltmeters for applications of seismic monitoring of sites, monitoring and/or control of civil and industrial buildings (buildings, dams, bridges, tunnels), monitoring and/or control for manufacturing seismic mitigation systems and inertial platforms etc.

The novel method which is the subject of the invention will be described first in its basic form, by way of non-limiting example, aimed at the creation of a fixed structure made of aluminum alloy (e.g. AL6092-T6) which supports the arm of a simple pendulum, the point of suspension and rotation point of which is constituted by a thin elastic joint with elliptical profile (ellipticity 16/5) characterized by major semi-axis $S_M$=8 mm; minor semi-axis $S_m$=2.5 mm; joint thickness $S_g$=0.1 mm; joint depth $P_g$=5 mm.

It is important to emphasize that, although the described procedure aims at creating a thin elliptical joint, such a procedure is also directly applicable to the manufacturing of a thin metal sheet or other metal sheets, which can be interpreted as elliptical joints with infinite ellipticity.

The method provides the execution of successive steps, described in detail below, in the description which highlights the processing type and method, but also the general reasons.

Figure 1:
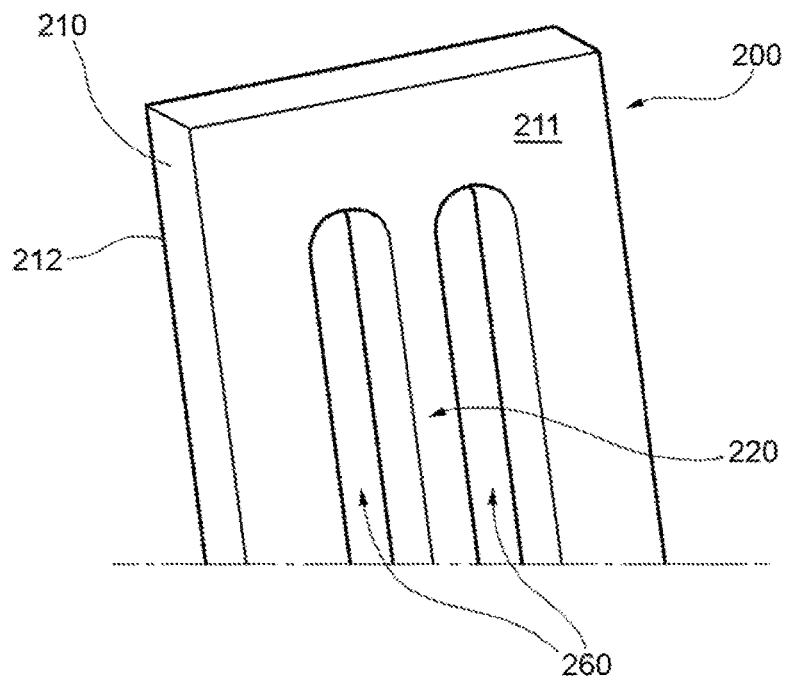
FIG. 1 shows Step 1 of the processing method according to the present description, with a diagrammatic drawing of the piece prepared for manufacturing the joint with two milling cuts passing along the vertical.

FIG. 1 diagrammatically shows the piece to be worked, prepared for the working the joint with two common through milling cuts along the vertical. However, it is worth specifying that the preparation milling cuts do not have to be through.

There are six necessary mechanical working steps aimed at manufacturing an elliptical joint (or a thin metal sheet) as detailed below.

Although reference will always be made to an elastic joint in the present description, the method of this description can also apply to a non-elastic joint.

Step A.1. Preparation of the Material.

In the specific exemplifying case, a 1.5-cm thick block of material is used, in which two 0.9-cm wide vertical apertures are made, leaving a 0.51-cm wide bar of material in the center (pendulum), on which the elliptical joint will be made in a later step. These measurements are not restrictive.

Reference numerals from 200 to 290 will indicate the components and the various steps of working of the blank block indicated by reference numeral 210, comprising the shaping and the elliptical joint being formed.

The block or piece 210 from which the material will be removed by means of milling is firstly worked as shown in FIG. 1, i.e. with a front surface (or first face) 211 (which is advantageously flat) and with two through apertures 260 (but in general it would also be possible with two non-through apertures, as at the beginning of the processing of the folded monolithic pendulum, described below). Opposite to the front surface there is another front surface (or second face) 212, with connecting walls between the two opposite surfaces. The two apertures mutually define an element 220 with a main direction of extension along the main direction of the apertures, and a depth in the direction perpendicular thereto (and perpendicular to the first and second face).

Step A.2. Milling of the First Face of the Joint.

Figure 2:
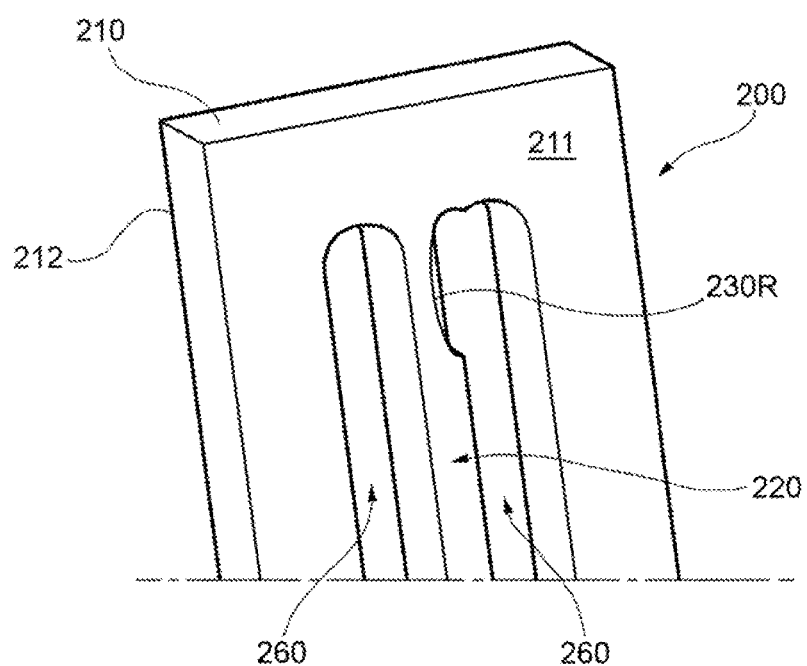
FIG. 2 shows a diagrammatic drawing of the production at the end of Step 2 following that of FIG. 1, showing the right side of the elliptical joint.

The first face of the elliptical joint is milled by removing materials to a depth slightly greater than the design depth of the elliptical joint using a cutter of an appropriate size determined each time. This milling leads to manufacturing the right face (but it is also possible to start from the left face) of the elliptical joint, shown in FIG. 2. A possible finishing operation on this face must be done in this step. Reference numeral 230R indicates the elliptical joint shape worked only on the right.

In the specific exemplifying case, since a joint with a depth of 5 mm is to be made, the material is removed with a cutter of diameter of 4 mm up to a depth of ps slightly greater than 5 mm (e.g. 5.5 mm). In general, although there is no predefined limit, the depth ps is preferably greater than the design depth in a percentage from 5 to 20%, even more preferably from 7 to 15%.

The choice of the increase depends on the thickness of the joint and of the drill bit for the perforation which will be used later; in the case shown above, 0.5 mm was chosen taking into account the high processing precision of the machines in use. Much also depends on the chips and burs which are produced during the cut, which in turn depend on the type of material.

Step A.3. Milling of the Second Face of the Joint.

Figure 3:
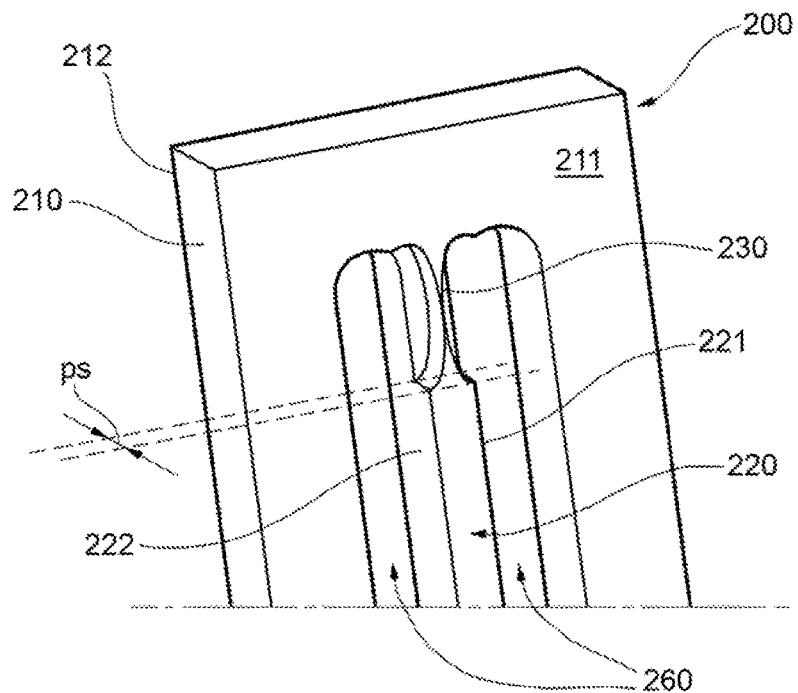
FIG. 3 shows a diagrammatic drawing of the production at the end of Step 3 following that of FIG. 2, showing the left side of the elliptical joint.

Using the same cutter as in the previous step (but it is also possible to use a different one, e.g. to manufacture an asymmetrical joint), the second face 222 of the elliptical joint is milled and the material is removed to the same depth as in Step A.2. FIG. 3 shows the processing of the left side of the thin metal sheet, the milling of which leads to the creation of the left side of the elliptical joint and thus to the pre-final elliptical joint or "worked element" 230. A possible finishing operation on this face must be done at this step, in which the joint is still anchored.

It is worth empathizing that during the step of working, the elastic joint, even if of small thickness, deforms minimally under the pressure of the tool, because the rear part (i.e. the lower section of the joint) is still monolithic with the block being worked, which therefore allows a normal milling operation. Since such a pressure is linked to the size of the cutter used, the latter must be chosen so as to reduce the deformation of the joint during the step of working to negligible values in relation to the final precision required and the mechanical properties of the material used.

In the specific exemplifying case, the second face is milled by removing the material, again with the 4-mm diameter cutter, to a depth of 5.5 mm, thus achieving a minimum thickness required by the project between the two faces equal to 100 microns. However, there is generally no requirement for joint thickness.

Step A.4. Joint Detachment.

Figure 4:
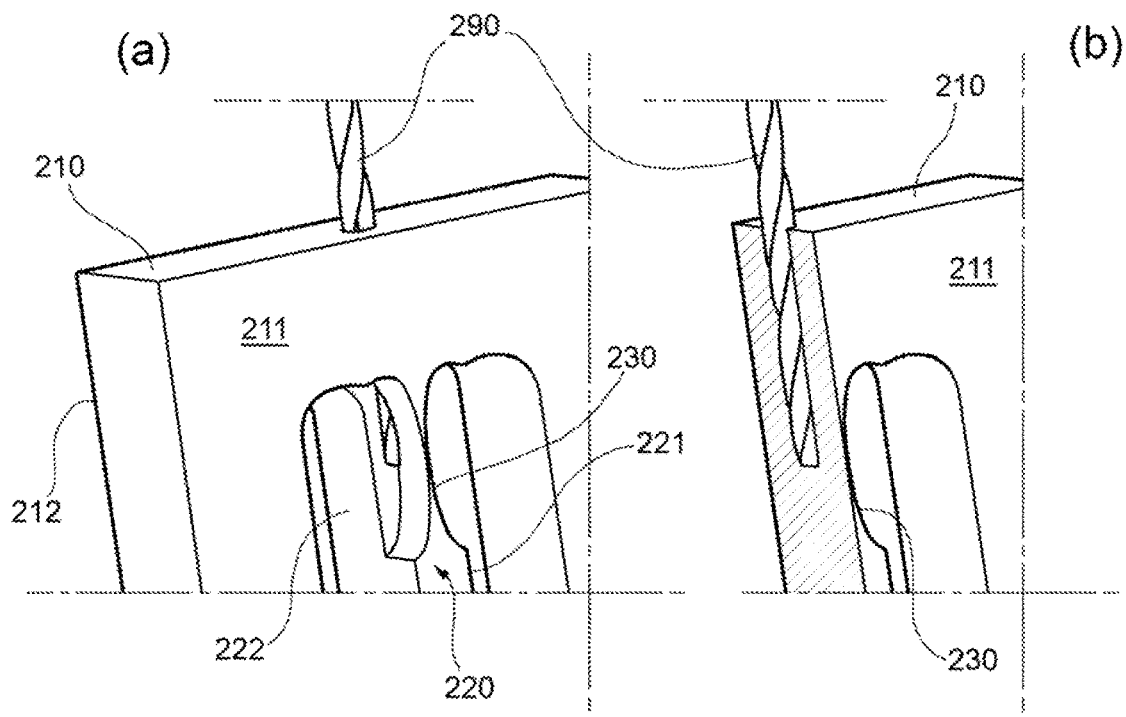
FIG. 4 shows details of Step 4 of the detachment of the elliptical joint and, in particular, in (a) the position of the drill bit in the middle of the perforation and in (b) the vertical section of the hole.

In this step, a hole is made by drilling on the aforesaid connecting wall, i.e. on the face which is orthogonal (in general, it is not necessary for it to be orthogonal) to the one being worked in Steps 1 and 2. The drilling is along an axis parallel to the first face 211 and the second face 212 opposite to the first face, as shown in FIG. 4. In particular, FIG. 4 shows the position of the drill bit 290 in the middle of the perforation 280.

This type of perforation, characterized by the cutting of the bit tangent to the section of the joint, allows its detachment from the rest of the material. FIG. 4(b) shows the vertical section of the hole with the bit inserted. During this step of working, the joint is not subjected to mechanical stress because during the advancement of the bit during perforation the part being worked of the joint 230 is always monolithic with the material being worked. Therefore, the shear forces are on the structure, which in the instant before the cut is sufficiently strong to allow the cut itself without deforming the joint, even if it is thin. Indeed, it is important to highlight that the bit is tangent to the joint only after removing material. In such a situation, however, since there is no removal of material from the part consisting the joint, there are no shear forces applied on the joint itself.

In the specific exemplifying case, the hole 280 is drilled with a 3-mm drill bit 290.

Figure 5:
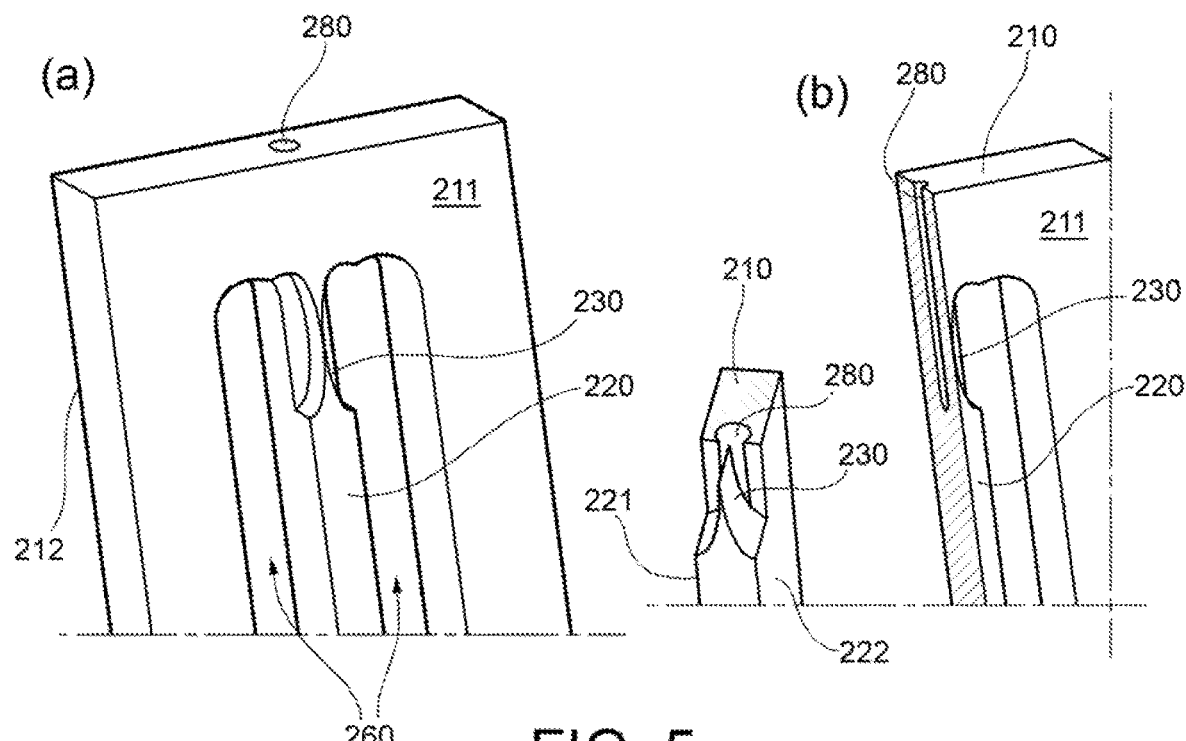
FIG. 5 shows the final result of the process of Step 4, with the detachment of the elliptical joint: the final result of the process is shown in (a); the material sections are shown in (c) and (b), respectively, which show how the joint has been detached from the rest of the material by perforation.

The result of this step of working is shown in FIG. 5(a). The respective sections shown in FIGS. 5(b) and 5(c) show how, by perforation, the joint was detached from the rest of the material.

Figure 6:
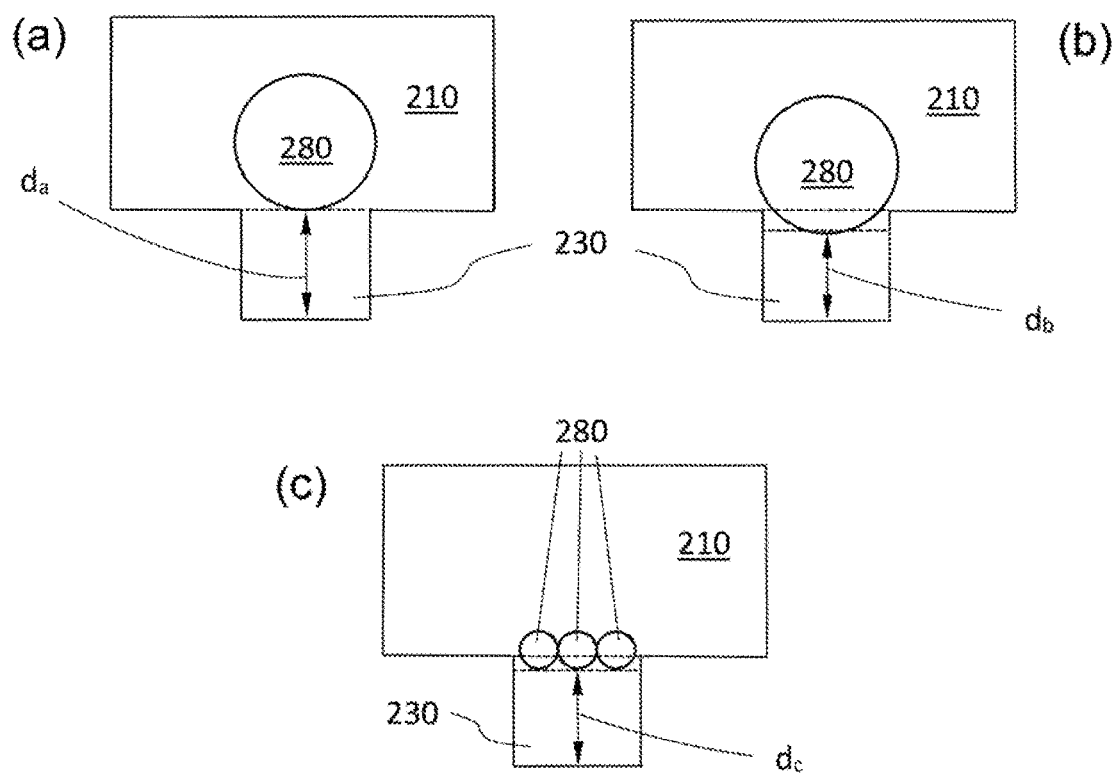
FIG. 6 shows a horizontal section of the joint according to the process in Step 4, with three possible different types of working (a), (b) and (c).

Referring now to FIG. 6, the drilling for detaching the joint with a hole 280 at the rear of the joint is illustrated in greater detail in the diagram. FIG. 6 shows in (a) a drilling which forms a circle 280 such that its circumference is tangent to the joint 230, or more precisely to that which will later become its wall or face. This is obviously a borderline case which ideally would not cause the joint to detach, unless it is infinitely thin at the point of least thickness. In order to approach complete detachment, the circumference must enter into the line of the aforesaid wall and thus also remove a portion of the wall material, as in (b). Having taken care to dimension the thickness $d_a$ (in our example equal to 5.5 mm) of the joint correctly, this does not imply structural losses for the joint, thus obtaining a minimum final thickness of $d_b$ (in our example equal to 5.0 mm) sufficient for the correct operation of the joint. An average final thickness can also be fixed a priori and $d_b$ can be calculated so that the drilling can reach such an average final thickness. Alternatively, it is possible to drill several holes with smaller diameter drill bits, as in (c), thus obtaining a final thickness almost uniformly equal to $d_c$, and such that $d_c > d_b$. It is also possible to drill firstly as in (a) and immediately after a finishing drilling operation as in (c). It is worth noting here that this finishing drilling or filing must be performed in the direction of the hole, thus avoiding directions which are significantly incident or even perpendicular to the axis of the hole, otherwise the joint would be subjected to stresses which would compromise its withstanding and the successive operation.

It is possible to obtain the detachment by means of drilling or several adjacent drilling operations with bit in the direction perpendicular to that of the opening of the joint or by means of milling again in the direction perpendicular to that of the joint aperture. However, this manufacturing method implies the creation of a further aperture in the piece, which is not always desirable, also because it may negatively stress the joint in some cases.

In general, in the present description, the drilling is a special case of milling, which is always intended as possible. More generally, one may speak of perforation, which can be performed with various techniques, comprising drilling and milling, and which may lead to a circular or non-circular hole.

Step A.5. Removal of Material not Adjacent to the Joint.

In this step, the remaining material of element 220 not adjacent to the elastic joint is removed by means of a further milling. Non-adjacent material means material which has no portion or surface in direct contact with the joint.

The sole purpose of this processing is to leave the joint and the pendulum arm free in order to obtain a flexible joint. The joint obtained so far is integral and monolithic with the rest of the structure, but does not yet fulfill the function of joint because the arm is still monolithic with both the joint and with the rest of the structure. For this reason, such a step must be considered optional, because it is related to the function of the structure which contains the joint.

In the specific exemplifying case, the remaining material not adjacent to the elastic joint is removed by means of a further milling operation with a 6-mm diameter cutter.

Step A.6. Disconnection of the Adjacent Parts at the Two Ends of the Joint.

Figure 7:
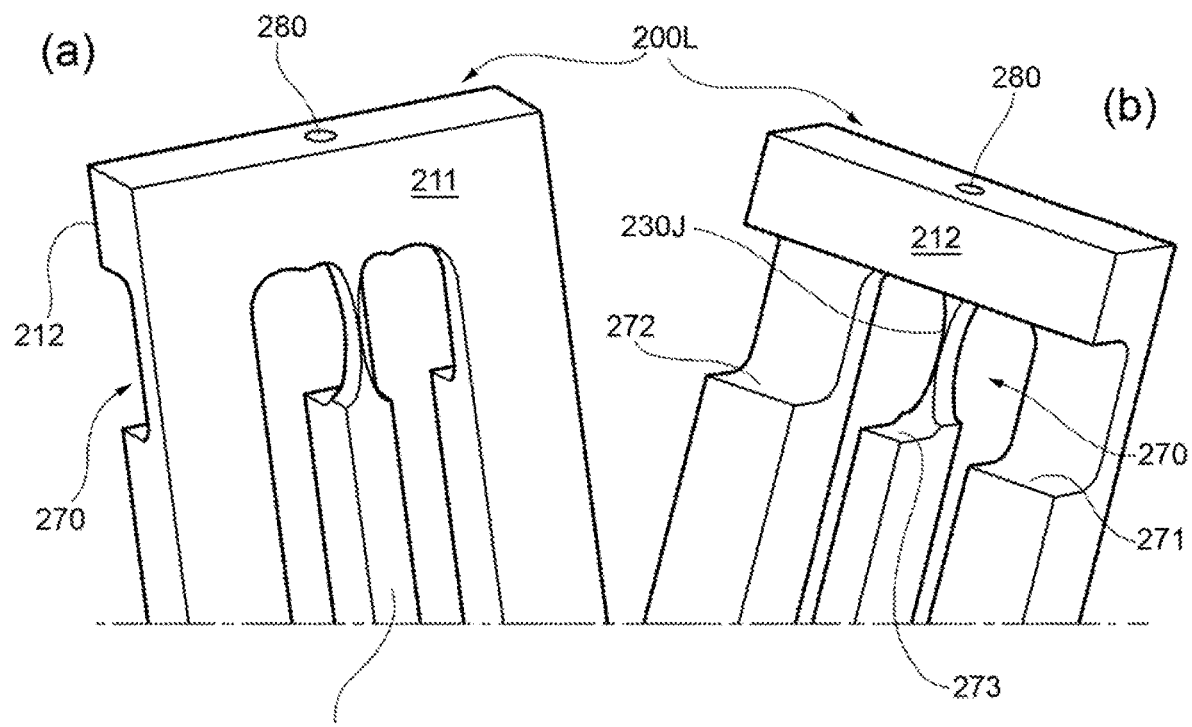
FIG. 7 shows the end result of the processing in Step 5 of the elliptical joint performed using the method described here: (a) shows a front view and (b) shows a rear view of the elliptical joint made using the method based on milling alone.

This last step requires the assembly of a bracketing system (more generally a "removable immobilization" system or means), necessary to avoid the breakage of the joint during processing, breakage due to the propagation of the forces applied on the pendulum arm (or on another part adjacent to the joint if this is not a joint of a pendulum) to the joint itself because of the monolithic nature of the pendulum with the joint itself and not due to the effects of shear forces on the joint. FIGS. 7(*a*) and 7(*b*) show the result of the processing, simple pendulum with elliptical joint, with two different views from front and back.

Figure 8:
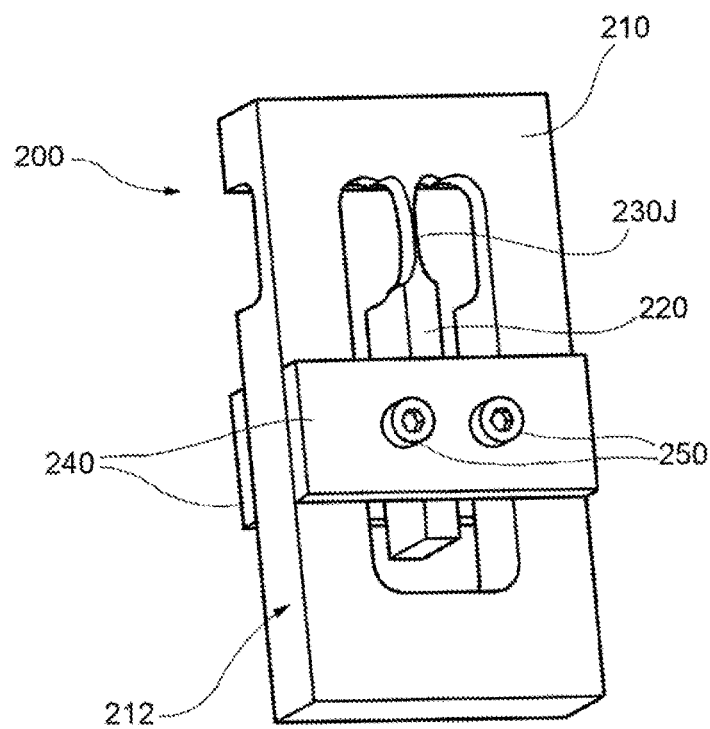
FIG. 8 shows the fixed structure which supports the arm of a simple pendulum, the suspension and rotation point of which consists of a thin elastic joint with an elliptical profile.

With further reference to FIG. 8, a bracketing system 240, 250 is prepared and applied to ensure the absence of relative motion between the pendulum and the structure in order to avoid deformations or breakage of the elliptical joint 230 during processing. In the specific exemplifying case, a final milling is performed with a 6-mm cutter to detach the parts adjacent to the elliptical joint.

More in general, taking into account the type of this manufacturing, the absence of relative motion between the pendulum and the structure is fundamental and obtained by means of the aforementioned adequate bracketing system to be applied in all steps of processing which require it. Indeed, if the central element 220 in FIG. 1 is not sufficiently rigid, then it must be locked, but if it is rigid, it is possible to proceed until the end of the procedure without locking it. It goes without saying that the bracketing is often necessary after creating the sheet and before milling the non-adjacent parts for thin metal joints.

It is worth noting that, in principle, a mixed method can be used, i.e. milling for creating the thin metal sheet, electrical discharge machining for detaching and/or removing non-adjacent parts, although less convenient than using the milling technique alone.

Application of the Technique for Manufacturing a Folded Monolithic Pendulum

As explained above, in the known art, the processing of a folded monolithic pendulum, the joint points of which are constituted by elastic joints of thickness of the order or less than one tenth of a millimeter, is performed with mixed procedures based on milling and WEDM. The latter is used, in particular, for all the cuts passing through the monolithic block, for creating edges with curvature radius of the diameter of the tool (200-300 micrometers) and, obviously, for manufacturing the eight thin elastic joints, which characterize this type of obtained item.

Taking advantage of the method for the manufacturing of thin metal sheets and joints by means of milling described in the previous section, we will now describe a novel mechanical processing method for manufacturing a folded pendulum by means of milling alone, known by the Inventors but never implemented or described before. In particular, in the provided example, which is of general validity not limited to the specific embodiment described herein, the eight thin elastic joints to be made have the same dimensions and features as those used in the general description of the previous section and the material used is also the same.

The manufacturing method is also described in this case by means of successive steps of working, similar to those described above for manufacturing the elliptical joint of a simple pendulum, but with important differences due to the specific manufacturing of a folded pendulum, even if technically employing the same manufacturing method as a single thin elastic joint.

As far as the bracketing system is concerned, it must be designed and applied so as to ensure the absence of relative motion between the various movable parts of the folded pendulum and the supporting structure so as to avoid deformations or breakages of the elliptical joints during the processing and/or the successive transport of the pendulum. Such a bracketing system was specifically designed for this purpose and is therefore also a subject-matter of this description.

Step B.1. Preparation of the Material.

Reference numerals from 300 to 395 will indicate the components and the various steps of working of the blank block indicated by reference numeral 310, comprising the shaping and the elliptical joint being formed.

The block of material 310 from which the folded pendulum 300 is obtained is advantageously worked to form a parallelepiped with parallel opposite faces (e.g. 311, 312), optional parallelism and obtained by grinding the them by means of milling. The eight elastic joints will be made in the following steps on the surfaces of two of these opposite faces, named front or first 311 and rear or second 312.

Figure 9:
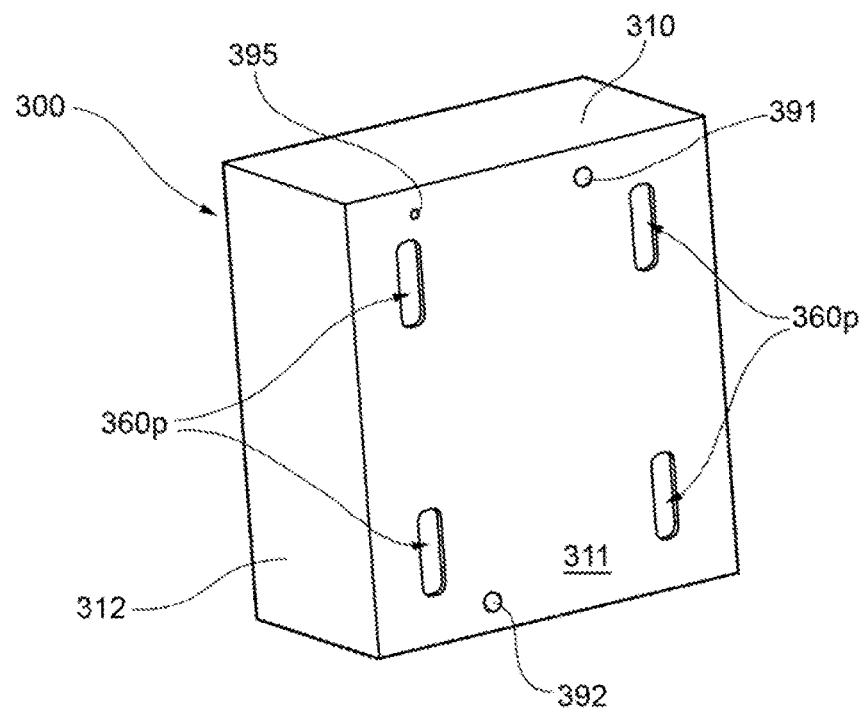
FIG. 9 shows a semi-finished piece which is used to start the method according to the present description, in order to produce a folded monolithic pendulum.
Figure 10:
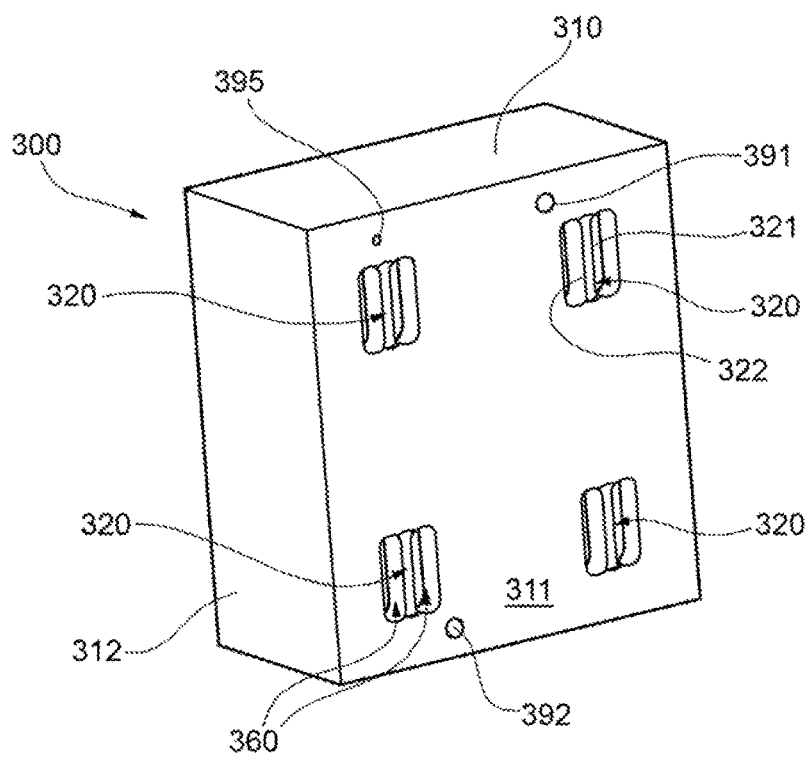
FIG. 10 shows the result of the preparation of the piece to be worked relative to Step 1 for manufacturing a folded monolithic pendulum according to the present description, showing the apertures at the joints to be made and the reference holes made for this step of the process.

Referring to FIG. 9, reference holes 395 are initially made by means of milling and holes 391, 392 on such faces 311, 312 to accommodate the fixing pins needed to block the oscillating mass during transport. Then the faces 311, 312 are optionally worked in order to manufacture shallow apertures 360$p$ in the design position of the joint and advantageously concerning the entire area of the joint itself. The function of these apertures, to be advantageously made during the first step of working, is to avoid contact between the external profile of the joints and the protection plates (designed and made as described in the following steps), which will be applied to protect the delicate joints of the folded pendulum during the steps of transporting and installing and during the step of operating of the folded pendulum. In practice, the elliptical joints will be made slightly recessed from the front and rear surfaces to ensure maximum operational safety. At this point, with reference to FIG. 10, the pairs of the apertures are made in each joint position, so that the light apertures 360p are in the middle, partially removed at the sides.

Step B.2. Milling of the First and Second Face of the Joints.

This step summarizes and merges Steps A.2 and A.3 relating to the manufacturing of the faces of each elastic joint of the pendulum described in the previous section. The right faces 321 of the joints are made first and then the left faces 322 are made for each of the two faces of the parallelepiped (front 311 and opposite 312) (the reverse being equally possible). Since the design depth of the joint is 5 mm, the material is removed to a depth of slightly greater than 5 mm (in this case 5.5 mm) with a 4-mm diameter cutter. Again in this case, a possible finishing operation on this face is preferable in this step, all the considerations made for Steps A.2 and A.3 of the previous description remaining valid.

It is worth noting here that electrical discharge machining does not require the removal of material at a depth greater than the design depth.

Figure 11:
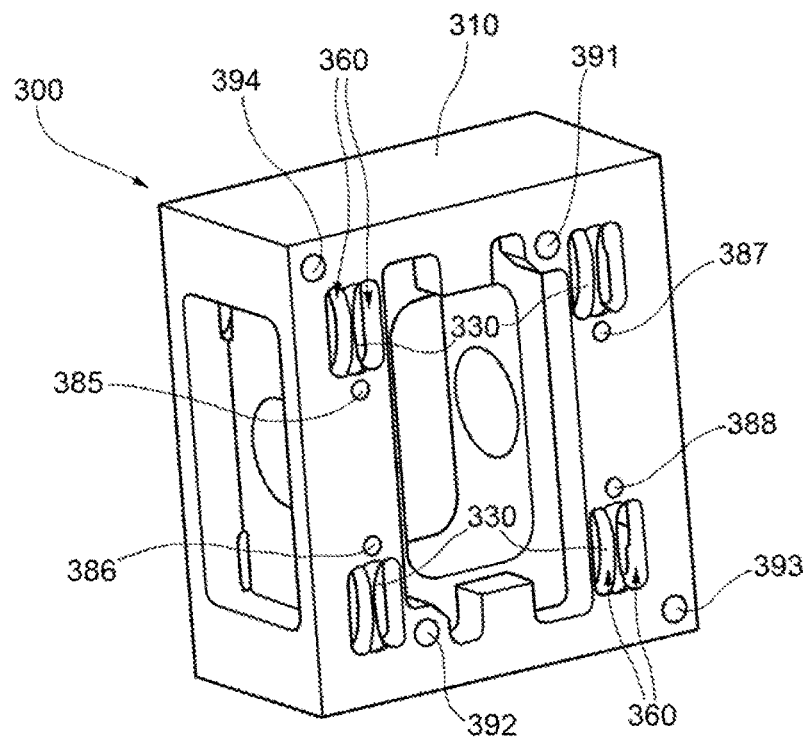
FIG. 11 shows the result of the process by means of milling aimed at manufacturing the two faces of the joints, also showing the additional through-holes made to apply external bracketing and/or protection plates of the obtained item for transport purposes or for possible fixing onto external surfaces.

FIG. 11 shows the result of the processing by means of milling related to this step. The further through holes shown in the figure are made for the purpose of applying of protection plates of the obtained item for transport purposes or for a possible fixing of the folded pendulum onto external surfaces, as described below.

Holes 385-388 are used to lock the arms of the folded pendulum, holes 391 and 392 are used to lock that which will be the central mass. This locking of the central mass is achieved, for example, by inserting two pins in these holes, and is useful, for example, during the transportation of the pendulum. Holes 393 and 394 are used to anchor the pendulum frame to an external structure.

Step B.3. Detachment of the Joints.

Figure 12:
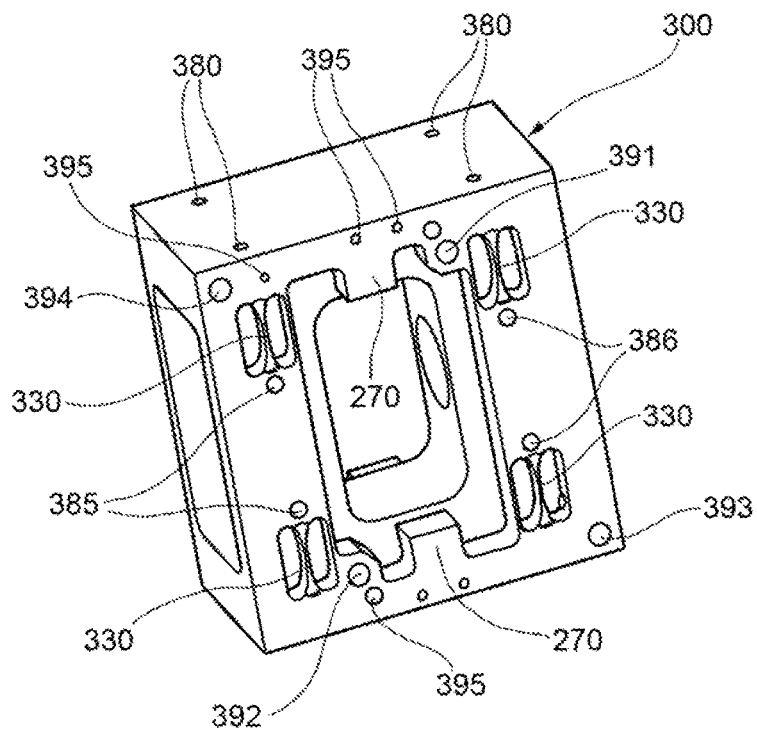
FIG. 12 shows the result of the process for detaching the joints from the rest of the material by drilling for manufacturing the folded pendulum according to the present description.

Eight holes 380 are drilled on the faces orthogonal to the one being worked in Steps B.1 and B.2 and parallel thereto, four holes in the upper face of the parallelepiped and four holes in the lower face at the joints 330 and orthogonal to one of the symmetry axes, as shown in FIG. 12 (in general, the joint has three planes of symmetry). The holes are drilled with a 3-mm drill bit in the manner described in Step A.4 of the description of the simple pendulum. Other reference holes 395 can be made in this step, as shown in the figure.

Figure 13:
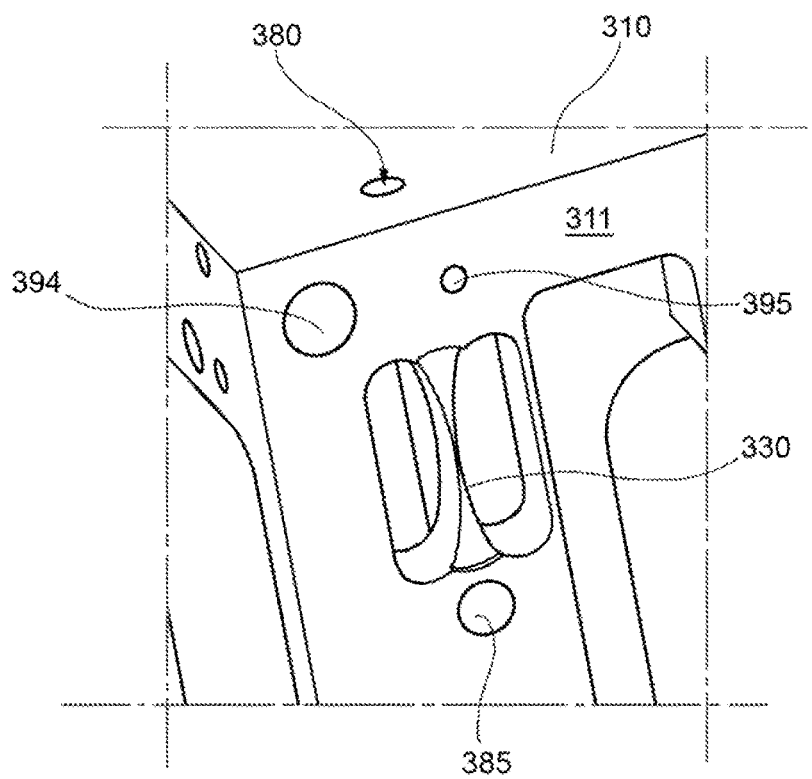
FIG. 13 shows a detail of the semi-finished product in FIG. 12.

FIG. 13 shows the position of the hole 380 made by means of drilling in greater detail.

It is again worth noting that this type of perforation, characterized by the cutting of the bit tangent to the section of the joint, allows its detachment from the rest of the material. During this step of working, the joint is not subjected to mechanical stress because during the advancement of the bit during drilling the part being worked of the joint is always monolithic with the material being processed. Therefore, the shear forces are on the structure, which in the instant before the cut is sufficiently strong to allow the cut itself without deforming the joint, even if it is thin. Indeed, it is important to empathize once again that the bit is tangent to the thin metal sheet only after having removed material, but in this situation, since there is no removal of material from the part constituting the joint, no shear forces are applied on the joint itself. The same considerations apply as in the description of the method for the simple pendulum.

Figure 14:
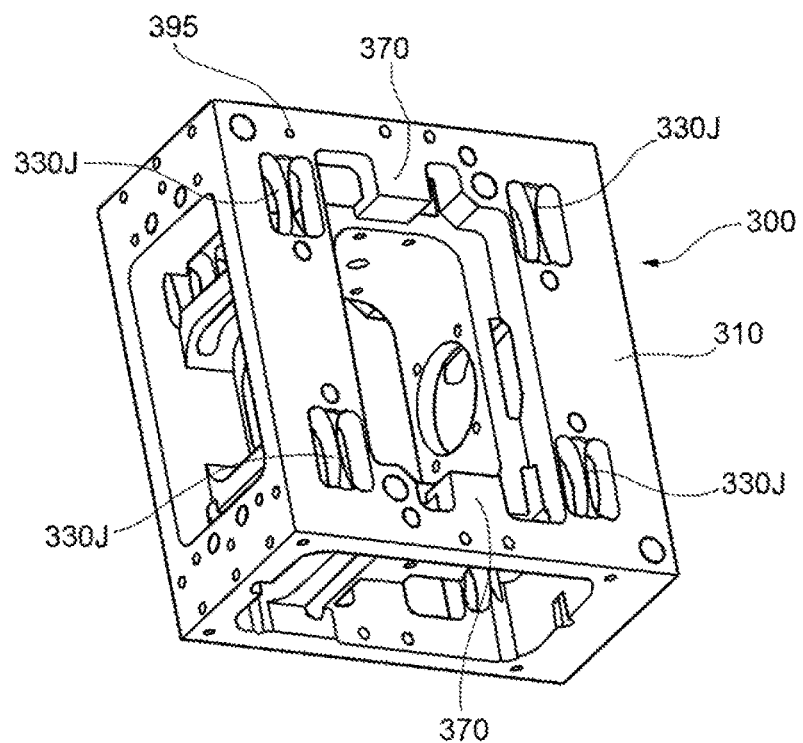
FIG. 14 shows the result of the process in Step 5, aimed at removing material not adjacent to the elastic joints by means of additional milling.

The result of this step of working for the folded pendulum is shown in FIG. 14, which shows the joints in their final state 330J.

Step B.4. Removal of Material not Adjacent to the Joints.

In this step, the remaining material not adjacent to the elastic joints is removed by means of a further milling.

The sole purpose of this processing is to leave the joints and the arms of the pendulum and of the inverted pendulum free in order to obtain flexible joints. The joints obtained so far are indeed intact and monolithic with the rest of the structure, but do not yet fulfill the function of joints being the arms still monolithic with the joints and with the rest of the structure. The structure of FIG. 14 is thus obtained.

Further processing operations, consisting of conventional milling and perforation, aimed at positioning the mechanical components of the connection (to the readout systems) take the piece to the state described in FIG. 15, which is the starting point of the next step.

Step B.5. Disconnection of the Movable Parts at the Two Ends of the Joints.

The movable parts connected to the ends of the sheets are detached in this step. FIG. 15 shows the state of processing at the end of Step B.4, showing with dashed ellipses the parts on the front face 311 which keep the movable parts (arms, central mass) of the folded pendulum locked to the fixed structure (the rear face is identical, having been worked with the same procedure). The detachment of the arms of the pendulum and of the central mass requires the installation of the bracketing (or "removable immobilization") system 400 (described with reference numerals from 400 to 494), necessary to avoid the breakage of the joints during this processing. It is worth noting again that such a breakage is due to the propagation of the forces applied by the arms of the pendulums, subject to thrusts due to cutting while processing, on the joints themselves because of the monolithic nature of the pendulums and the central mass with the joints themselves, and not due to the effects of shear forces on the joints. FIG. 16 shows a bracketing system, developed specifically for this type of processing, which is also a subject-matter of the present description. FIG. 17 shows the monolithic pendulum 300 WL with holes for locking the two arms 300A of the pendulums (385, 386 for one pendulum and 387, 388 for the other pendulum), holes 391 and 392 for locking of the central mass 310M and holes 393, 394 for locking to the fixed structure or frame 300F, on which the holes 485-488, 491-494 of the plate 410 of the bracketing system 400 (with appropriate screws/bolts or other pin means) are positioned. The plate 410 also displays recesses 461-464 (also known as "apertures") in the perimeter profile, which allow access for working the non-adjacent parts shown with dashed lines in FIG. 15.

The joints 330J are thus locked. The bracketing system (more generally the immobilization system) 400 may comprise only one plate to be applied to one of the two opposite faces 311, 312, or two plates to be applied to both opposite faces.

FIGS. 17 and 18 show the final result of the processing with two different views. It is worth noting that the portions 370 which created a rigid bridge between the central mass and the frame have been removed.

It is worth noting here that the plate 410 (and the corresponding pin devices) is only an example of more general immobilization means. An example is also given by a plate but without holes, which holds the free central mass and the arms in position by friction or by contrast of shape. Furthermore, the apertures are not necessary because a CMC can work on the parts of the monolithic piece while machining the plate 410. The plate must also not be flat on both sides.

A person skilled in the art may think of other immobilization systems which ensure the removable immobilization of the free central mass and of the arms during the final step of processing of the piece once the steps of the method as above are known, also according to on the material of the monolithic pendulum.

Advantages of the Invention

The methodology of the present description opens up a totally new field not only for the mechanical working of thin metal sheets and joints, but also for all mechanical components which make use thereof, allowing, for example, for the first time the manufacturing of Watt's linkage based monolithic mechanical sensors in a folded pendulum configuration with non-metallic materials and at low cost, illustrated below as a direct application.

The suggested novel method has two important advantages:
a. it allows the manufacturing of thin metal sheets and joints with a thickness of even less than 100 microns, but of superior quality in terms of surface finish compared to WEDM;
b. it allows the manufacturing of thin metal sheets and joints of non-conductive materials, thus overcoming one of the most important limitations displayed by the WEDM technique.

An indirect advantage is instead given by the possibility to develop fully automatic working procedures, with an increase in working speed and a reduction of production costs, as well as further working possibilities, e.g. the creation of through holes, threads, thin sheets (<100 um) without structure deformations or modifications (e.g. due to the passage of electricity through electrical discharge machining), working on non-conductive materials.

More in detail, WEDM uses a wire made of conductive material as a tool, which is stretched through a hole into the material, which must necessarily be a good conductor, and moved until coming into contact with the material itself in order to obtain the cut.

The process is based on the thermo-mechanical property of electrical discharges to erode materials and consists in approaching the cutting tool (electrode) closer to the material to be worked, immersing material and electrode in a liquid dielectric, which also has the function of cooling down the material during the process. A negative electrical potential is thus applied to the tool with respect to the worked material. When the distance between the tool and the material is sufficiently small to generate a discharge through the dielectric, a plasma channel (arc) is generated, which melts the surface of the material and removes it at the points in which the cut is intended.

During cutting, the tool is advanced as the erosion proceeds, so as to maintain a predefined distance from the material being worked. The process generates waste, which appears as dust and is dispersed in the dielectric, not chips.

This technique has three important advantages:
a. possibility of working very hard metals (special steels, high-speed steels, hard metals, etc.), or metals hardened with heat or chemical treatments (tempered, carburized, etc.), it not being necessary for the tool (wire) to have a hardness or a mechanical strength greater than that of the worked material;
b. possibility of making cuts and holes which are impossible with conventional techniques (sharp edges, ribs and cavities with complex shapes or profiles);
c. possibility of working very thin metal sheet surfaces, because the passage of the wire does not apply pressure onto the surface to be worked, thus not subjecting the material to stress during the working.

Working by means of mechanical milling, on the other hand, is a completely different method, because it works by mechanical removal of material by means of the action of a cutting tool having defined geometry. Milling allows high machining accuracies and an excellent surface finish (up to 100 nanometers), allowing the production of pieces with tolerances of less than one micron and mirror surfaces.

The process is performed by means of tools, called cutters, mounted on machine tools (milling machines). Milling is based on the rotation of the tool and on the relative movement between the rotating cutter and the material to be worked: during rotation, the cutting edges of the cutter remove the material from the piece when it comes into contact with the cutter as a result of a translation between the piece to be worked and the cutter itself. An important element, however, of the milling action, is that the cutter must necessarily apply pressure on the surface on which it acts to remove the material.

In general, the milling process implies a first roughing step and a finishing step. Roughing removes material from the piece being worked more rapidly, and thus more economically, leaving a sufficient layer of metal to be removed in the next finishing step. In this second step, the excess parts are removed to reach the expected dimensions, so as to respect design dimensions and tolerances, including those relating to the degree of roughness of the surfaces.

The milling processes are currently performed with CNC (Computer Numerical Control) machines, provided with adjustable heads (cutters) with tilting axes able to rotate gyroscopically along two axes, which allow the orientation of the cutters with respect to all the work planes, this property being relevant for manufacturing objects with even very complex shapes. Milling with CNC technology allows the creation of very smooth surfaces with very high precision (in the order of 100 nanometers), rapidly, automatically and at a very low cost, but does not allow the production of thin metal sheets and joints (in the order of 100 microns) by direct application.

The following table summarizes the main differences between the two techniques.

| | Technique | |
|---|---|---|
| | WEDM | Milling |
| Thin metal sheets and joints | Possibility of manufacturing thin metal sheets and joints up to 50 microns thick, without introducing deformations and mechanical stress during the step of working. | Impossibility of manufacturing thin metal sheets and joints, due to the introduction of deformations and mechanical stress during the step of working, which can lead to breakage. |

-continued

| | Technique | |
|---|---|---|
| | WEDM | Milling |
| Materials | Only conductive materials (steel, aluminum, etc.) can be worked. | All materials can be worked. |
| Processing | Possibility of manufacturing even small holes and through edges in the material (radius of curvature 125 microns). Impossibility of manufacturing threads. | Possibility of manufacturing holes (even not through holes) in the material. Possibility of creating internal edges. Possibility of manufacturing threads |
| Cost | High process costs. | Low process costs. |

Additionally, with the method of the present description, it is possible to work a piece by creating offset thin metal sheets on opposite faces of the workpiece, which is impossible with electrical discharge machining. For example, it is possible to create overlapping joints with mutually perpendicular directions in order to create triaxial sensors, for example.

In brief, at present, thin metal sheets and joints are necessarily made using the WEDM technique using only conductive materials because working thin metal sheets and joints with a thickness of less than a few hundred microns by means of milling is not possible.

LITERATURE

[1] Grimaldi, F., "Manuale delle Macchine Utensili CNC", Hoepli, Italy (2007).
[2] Barone, F., Giordano, G., *Mechanical Accelerometers*, J. Webster (ed.), Wiley Encyclopedia of Electrical and Electronics Engineering. John Wiley & Sons, Inc., doi: 10.1002/047134608X.W8280 (2015).
[3] Barone, F., Giordano, G., *The UNISA Folded Pendulum: A very versatile class of low frequency high sensitive sensors*, Measurement, https://doi.org/10.1016/j.measurement.2017.09.001 (2017).
[4] Barone, F., Giordano, G., Low frequency folded pendulum with high mechanical quality factor, and seismic sensor utilizing such a folded pendulum, International application published under the patent cooperation treaty (PCT) WO 2011/004413 A3 (2011), Patent Numbers: IT 1394612 (Italy), EP 2452169 (Europe), JP 5409912 (Japan), RU 2518587 (Russia), AU 2010269796 (Australia), U.S. Pat. No. 8,950,263 (USA), CA 2763204 (Canada).
[5] Barone, F., Giordano, G., Acernese, F., Low frequency folded pendulum with high mechanical quality factor in vertical configuration, and vertical seismic sensor utilizing such a folded pendulum, International application under the patent cooperation treaty (PCT) WO 2012/147112 685 (2012), Patent Numbers: IT 1405600 (Italy), EP2643711 (Europe), AU 201247104 (Australia), JP 5981530 (Japan), RU 2589944 (Russia), 9256000 (USA), Canada pending.
[6] Barone, F., Giordano, G., Acernese, F., Method for the measurement of angular and/or linear displacements utilizing one or more folded *pendula*, International application under the patent cooperation treaty (PCT) WO 2016/020947 (2016), Patent Number: IT 1425605 (Italy), Europe, Japan, USA, Canada pending.
[7] Sommer, C., Sommer, S., "Wire EDM Handbook", Advanced Publishing (2000).

Hereto, we have described the preferred embodiments and suggested some variants of the present invention, but it is understood that a person skilled in the art can make modifications and changes without departing from the respective scope of protection, as defined by the appended claims. In particular, the individual embodiments or the individual optional features can be freely combined while respecting the inventive concept underlying the invention.

What is claimed is:

1. A method for achieving a monolithic folded pendulum from a blank made of a material, the method comprising the following steps:
   LA. Preparing said blank so that:
      LA1. it comprises two opposite flat main faces; and
      LA2. there are eight pairs of apertures on said two flat main faces in a direction substantially perpendicular to said two flat main faces, in each of the eight pairs of apertures there being defined an element with a main extension direction and a first side and a second side, opposite to the first side, along said main extension direction, said first side and said second side having a surface substantially perpendicular to said two flat main faces;
   LB. In each of the eight pairs of apertures, working said first side, by milling a portion of the material of said element along said perpendicular direction from one of said two flat main faces to a depth deeper than a design depth;
   LC. In each of the eight pairs of apertures, working said second side, by milling a portion of said element along said perpendicular direction from one of said two flat main faces to said depth (ps) deeper than the design depth,
   wherein the operation of steps LB and LC is adapted to form a worked element between each of the eight pairs of apertures, thus forming eight worked elements, and wherein the following further steps are performed:
   LD. Drilling four holes in a first connecting face of said blank which connects said two flat main faces, the four holes being formed to said depth (ps) respectively parallel to four worked elements of the eight worked elements, so that said four worked elements of the eight worked elements are removed from the blank to said design depth;
   LE. Drilling four further holes in a second connecting face of said blank which connects said two flat main faces, said second connecting face being opposite to said first connecting face, the further four holes being formed to said depth (ps) respectively parallel to the other four worked elements of the eight worked elements, so that said other four worked elements of the eight worked elements are detached from the blank to said design depth, thus obtaining eight corresponding joints;
   LF. At two joints of the eight corresponding joints per flat main face, removing material from said blank which is not adjacent to each of the two joints of the eight corresponding joints, so that each of the two joints of the eight corresponding joints is connected at one end only to a central portion of said blank worked to act as an oscillating mass in the folded pendulum;

LG. Applying an immobilization system of said eight corresponding joints to at least one of the two flat main faces by immobilizing portions of said blank along said main extension direction with fall between pairs of joints of said eight corresponding joints; and LH. Working the blank so as to detach said eight corresponding joints and said central portion from the rest of the blank, thus obtaining a free central mass connected, through pendulum arms, to a frame by means of the eight corresponding joints, according to a folded pendulum scheme.

2. A method according to claim 1, wherein said depth is greater than the design depth by a percentage ranging from 5 to 20%.

3. A method according to claim 2, wherein said depth is greater than the design depth by a percentage ranging from 7 to 15%.

4. A method according to claim 1, wherein the immobilization system comprises at least one removable immobilization plate with:

at least one first hole configured for a first removable rigid connection to said frame;

at least one second hole configured for a second removable rigid connection to said free central mass; and for each of the pendulum arms, at least one respective third hole configured for a third removable rigid connection of a respective one of the pendulum arms;

wherein four further side apertures are present, being shaped so as to allow access the connection areas between the frame and the pendulum arms and between the frame and the free mass for working.

5. A method according to claim 4, wherein said at least one first hole includes at least two first holes, said at least one second hole includes at least two second holes, and said at least one respective third hole includes at least two respective third holes in the at least one removable immobilization plate.

6. A method according to claim 1, wherein the immobilization system is applied on both said two flat main faces in step LG.

\* \* \* \* \*